United States Patent Office 2,829,028
Patented Apr. 1, 1958

2,829,028

REMOVAL OF INORGANIC FLUORIDES FROM CRUDE GASEOUS HYDROGEN CHLORIDE BY ANION EXCHANGE RESINS

Charles E. Aho, Louisville, Ky., and William S. Murray and Walter John Sloan, Wilmington, Del., assignors to E. I. du Pont de Nemours and Company, Wilmington, Del., a corporation of Delaware No Drawing. Application October 24, 1955
Serial No. 542,503

7 Claims. (Cl. 23—2)

In the manufacture of chlorofluorohydrocarbons, a crude hydrochloric acid is obtained as byproduct. This material contains various impurities, principally $SiF_4$ and HF and these fluoride impurities must be removed in order that the hydrochloric acid can be used in certain other applications. This by-product HCl is normally anhydrous material and a method is needed to remove the inorganic fluoride impurities from it while the HCl remains gaseous. In addition, it is desirable for the recovered HCl gas to contain less than about 10 parts per million of fluoride ion in order that it can be used, as for example, in the preparation of chloroprene. A still further requirement for such a recovery process is that it operate economically; that is, the rate at which the by-product HCl is recovered must be relatively high.

It is known to pass HCl gas containing HF and $SiF_4$ over adsorbents to remove the fluoride ions. Heretofore, however, such processes have been limited to relatively low recovery rates; furthermore, the adsorbents utilized could not be regenerated.

It is an object of this invention to provide a process for the recovery of by-product HCl, said by-product containing less than 10 parts per million of fluoride ion. It is a further object to effect this result at a high recovery rate and by means that enable the purifying adsorbent to be regenerated.

The present invention accomplishes the desired purification of the gaseous HCl in a process which reduces the content of inorganic fluorides in crude by-product hydrogen chloride gas by passing the hydrogen chloride vapor through a strongly basic anion exchange resin bed, said resin comprising a copolymer of styrene and divinylbenzene containing quaternary ammonium groups, said resin having been impregnated at a temperature within the range of 0–60° C. with aqueous hydrochloric acid saturated with boric acid, said hydrogen chloride vapor being passed through the treated resin at a flow rate between about 200 and about 700 cubic feet per hour per cubic foot of resin.

Another object accomplished as a result of the present invention is the regeneration of the resin utilized in the purification of the gaseous HCl by-product, said regeneration being accomplished by treating the expended resin with water followed by treatment of said resin with aqueous HCl saturated with boric acid.

The source and exact nature of by-product HCl treated by the process of this invention is not critical, but preferably the inorganic fluoride content should be less than about 10% or 100,000 parts per million. A common source of by-product HCl containing fluorides is from the manufacture of chlorofluorohydrocarbons or fluorohydrocarbons which are generally preapred from chlorohydrocarbons by reaction with an inorganic fluoride such as antimony pentafluoride and cobalt trifluoride. The by-product HCl obtained in such reaction contains varying amounts of HF and $SiF_4$. Normally the fluoride ion content of the HCl used in this process will contain from about 1000 to about 4000 parts per million of fluoride ion, principally as HF.

In carrying out this novel process, the resin is placed in a container (usually cylindrical) and treated with a hydrochloric acid solution saturated with boric acid; said resin is then ready to be utilized in the present purification process for purifying the crude HCl gas by passing the vapors of the crude HCl, generally at room temperature, through the resin bed. The purified HCl which results may be compressed into cylinders for ultimate use as a gas or it may be absorbed in water to give HCl acid solutions. The regeneration cycle of the resin may be carried out in the same equipment, thus making for an efficient economical process using a minimum of apparatus.

The resins which are useful in the process of this invention are strongly basic anion exchange resins. Such resins are commercially available from Rohm & Haas and are sold as "Amberlite" resins IRA–400, IRA–401, IRA–410, and IRA–411. These resins comprise copolymers of divinylbenzene and styrene which have been further treated to contain quaternary ammonium groups; said copolymer is first treated to introduce haloalkyl groups by reaction of the copolymer with haloalkylating groups such as a mixture of an aldehyde and a halogen acid (e. g., paraformaldehyde and hydrochloric acid) or a dihaloalkane and a Friedel-Crafts catalyst (e. g., ethylene dichloride and aluminum chloride) or a haloether and aluminum chloride. The resulting haloalkylated copolymer is then treated with a tertiary amine which yields an insoluble cross-linked polymeric quaternary ammonium salt. This commercial resin is then treated, in the present process, with an aqueous alkali metal hydroxide to convert it to quaternary ammonium hydroxide. These resins and the methods of preparing them are disclosed in U. S. 2,591,573 issued April 1, 1952 and assigned to Rohm & Haas Co.

In order for the above resin to be effective in removing fluoride ions from the by-product HCl, it is necessary to treat the resin with an aqueous hydrochloric acid solution saturated with boric acid. When using an aqueous boric acid solution alone, regeneration occurs, but excessive heating is obtained; this difficulty is avoided by using an HCl solution of boric acid. The treatment of the resin may be carried out at temperatures between 0° C. and 60° C., room temperature being preferred. At the lower temperature, the capacity of the treated resin in removing the fluoride ions is mitigated due to the reduction of the amount of boric acid on the resin and at temperatures much below 0° C., the effectiveness of the resin is seriously reduced. As the temperature increases up to 60° C. the capacity of the resin is increased; however, temperatures much above 60° may either damage the resin since it is temperature sensitive and it may cause practical difficulties. The resin is normally treated by allowing the aqueous HCl solution which is saturated with boric acid to flow over it. This treating solution is generally of a temperature within the range of 0 and 60° C. At the elevated temperature the resin should also be heated in order to prevent the boric acid from crystallizing out and thus reducing the efficiency of said treatment. Heating the resin in its hydroxide form may cause difficulties of a practical nature and for this reason room temperature treatments are preferred.

After the resin has been treated with the HCl-boric acid solution, all free liquid is drain off and the resin is ready for use. The drained resin retains a small amount of liquid on its surface and liquid also remains between the resin particles. The resin, as received, is in chloride form and contains moisture to the extent of being wet to the touch.

The space velocity with which the by-product HCl may be passed through the bed of treated resin may vary from about 200 to about 700 cubic feet per hour per cubic foot of resin depending upon the depth of bed. For a given bed depth, the amount of fluoride ion in the effluent will be proportional to the flow rate; i. e., the greater the flow rate, the less fluoride ion will be removed. On the other hand, the deeper the resin bed, the greater the amount of fluoride ion that will be removed for a given flow rate. Normally bed depths of from about 0.5 to about 5 ft. will be used. When the resin bed is much over 5 ft., the pressure drop increases and a practical limit is quickly reached. Preferably, operation will be carried out between about 400 and 600 cu. ft. per hour per cubic foot of resin at a bed depth ranging proportionately from about 2.5 to about 4 ft. Under these conditions the effluent will contain from less than 10 p. p. m. to about 20 p. p. m. of fluoride ion. At less than about 200 cu. ft. per hour per cu. ft. of resin the process is not practical because of the long time cycle required.

The effluent HCl removed from the treated resin will contain practically no fluoride ion. By means of this process it is possible to reduce the fluoride ion content to below 10 parts per million and at the lower space velocities the amount of fluoride ion contained in the effluent will be nil.

The process may be carried out at atmospheric or super-atmospheric pressures. Super-atmospheric pressures (about 25 lbs./sq. in. gauge) are preferred because the rate of exchange is improved somewhat at increased pressures.

The efficiency of the treated resin in the resin bed is measured in terms of the amount of fluoride ion that said bed absorbs. Normally this will vary from about 0.5% to about 1.1% fluoride ion on the weight of the starting resin. When the resin has absorbed all the fluoride ions it can be regenerated very simply and economically. For regeneration, the resin bed is first treated with aqueous caustic. By passing water through the resin bed at 10° C. to 60° C., the fluoride ions are removed from the resin (probably as fluoroborate) and the effluent containing them is then discarded. Water alone effects partial removal of the fluoride ions. The resin, after caustic treatment, is then in its hydroxide form and is ready for the final regeneration step by treatment with aqueous HCl saturated with boric acid.

The following examples illustrate the present invention:

*Example I*

A column of a strong base quaternary ammonium anion exchange type resin comprising a copolymer of divinylbenzene and styrene after-treated by chloromethylation and then quaternized with trimethylamine (Amberlite IRA–401) was packed to a height of twelve inches in a one-inch diameter glass tube. The resin was converted into the hydroxyl form by treating it with an aqueous solution of sodium hydroxide. The resin bed was rinsed with water to remove the excess alkali and the resin then treated at room temperature with 37% by weight aqueous hydrochloric acid solution saturated with boric acid. The treating solution was drained from the bed of resin and it was then ready for use.

Anhydrous HCl vapors containing 2300 p. p. m. of fluoride ion (principally HF with small amounts of $SiF_4$) were passed through the bed at a space velocity of 250 cubic feet per hour per cubic foot of resin. Portions of the effluent were analyzed and were found to contain less than 10 p. p. m. of fluoride ion. The bed was operated continuously until analysis of vapor input and output samples showed that the resin had absorbed fluoride ions to the extent of 1% by weight of the resin.

When the space velocity was reduced to about 200 cu. ft. per hr. per cu. ft. of resin, the effluent contained no fluorides.

*Example II*

Example I was repeated except that the depth of resin was increased to 3.5 ft. and the process was operated under a pressure of 25 p. s. i. g. The space velocity was increased to 700 cu. ft. per hr. per cu. ft. of resin and the effluent contained less than 10 p. p. m. of fluoride ions.

*Example III*

Example I was repeated but the resin bed was treated with the boric acid saturated hydrochloric acid solution at 0° C. The effluent anhydrous HCl vapors which have passed through the treated bed contained less than 10 p. p. m. of fluoride ion and the resin absorbed 0.6% of its weight as fluoride ion.

*Example IV*

Example I was repeated except that the resin bed was treated with the boric acid saturated hydrochloric acid solution at 60° C. The effluent anhydrous HCl vapors contained less than 10 p. p. m. of fluoride ions. The absorptive capacity of the resin bed was 1.4% of fluoride ion.

*Example V*

Example I was repeated except that the contaminated anhydrous HCl vapors contained 4000 p. p. m. of fluoride ions. The effluent gases contained 10 p. p. m. of fluoride ions.

*Example VI*

Example I was repeated, but with a two-foot depth of resin. The anhydrous HCl vapors were passed through at a space velocity of 375 cu. ft. per hr. per cu. ft. of resin and the effluent gases contained less than 10 p. p. m. of fluoride ions. The absorptive capacity of the resin was 1% by weight.

*Example VII*

When Example I was repeated with a resin bed of three feet in depth and the contaminated HCl vapors passed through at a space velocity of 480 cu. ft. per hr. per cu. ft. of resin, essentially the same results as given in Example I were obtained.

*Example VIII*

Example I was repeated with a resin bed of four-feet depth and a space velocity of 605 cu. ft. per hr. per cu. ft. of resin. Essentially the same results as given in Example I were obtained.

*Example IX*

Example I was repeated, but the resin used was Amberlite IRA–400 which is similar to that used in Example I, but is cross-linked to a greater extent. The effluent vapors contained less than 10 p. p. m. of fluoride ions and the absorption capacity of the resin was 0.5%.

*Example X*

Example I was repeated except that the resin used was Amberlite IRA–410 which is believed to be a copolymer of divinylbenzene and styrene after-treated by chloromethylation and quaternized with dimethylethanolamine. At a flow rate of 250 cu. ft. per hr. per cu. ft. of resin the HCl vapors originally containing 500 p. p. m. of fluoride ions emerged from the resin bed and contained less than 10 p. p. m. of fluoride ions. The absorptive capacity of the resin was 0.5%.

*Example XI*

Example I was repeated using Amberlite IRA–411 (same as Amberlite IRA–410 but less cross-linked) and essentially the same results as shown in Example I were obtained.

*Example XII*

The exhausted resin bed of Example I was regenerated by passing water at room temperature through the bed until the effluent showed no fluoride ion present. The bed was then treated at room temperature with a 37% by weight aqueous hydrochloric acid solution saturated with boric acid. The acid solution was drained from the resin and anhydrous HCl vapors containing 2500 p. p. m. of fluorides passed through the bed and results as described in Example I were obtained.

The regeneration was repeated using an aqueous caustic solution, the caustic treated resin being washed thoroughly with water to remove the excess alkali. This use and regeneration procedure was repeated for 3 cycles with no loss in operating efficiency.

*Example XIII*

Example I was repeated except that the HCl solution used to treat the resin did not contain any boric acid. Upon passing the contaminted anhydrous HCl vapors through the treated resin bed, no fluorides were removed. This showed that the chloride form of the resin does not exchange fluoride ions from gaseous HCl containing them.

We claim:

1. A process for reducing the content of inorganic fluorides in gaseous hydrogen chloride which process comprises passing said gas through a bed of a strongly basic anion exchange resin at a flow rate of 200 to 700 cu. ft. per hour per cu. ft. of the resin, said resin being a copolymer of styrene and divinylbenzene containing quaternary ammonium groups which has been impregnated at 0 to 60° C. with aqueous hydrochloric acid saturated with boric acid.

2. The process of claim 1 wherein the resin bed is of a depth within the range of 0.5 to 5 feet.

3. The process of claim 1 conducted at atmospheric pressure.

4. The process of claim 1 conducted at superatmospheric pressure.

5. The process of claim 1 wherein the strongly basic anion exchange resin bed is of a depth within the range of 2.5 to 4 feet and the flow rate of the gaseous hydrogen chloride is maintained at a rate of 400 to 600 cu. ft. per hour per cu. ft. of the resin bed.

6. A process for reducing the content of inorganic fluorides in gaseous hydrogen chloride which process comprises passing said gas through a bed of a strongly basic anion exchange resin at a flow rate of 200 to 700 cu. ft. per hour per cu. ft. of the resin, said resin being a copolymer of styrene and divinylbenzene containing quaternary ammonium groups which has been impregnated at 0 to 60° C. with aqueous hydrochloric acid saturated with boric acid, said resin, after use, being capable of regeneration.

7. The process of claim 6 wherein the strongly basic anion exchange resin bed is of a depth within the range of 2.5 to 4 feet and the flow rate of the gaseous hydrogen chloride is maintained at a rate of 400 to 600 cu. ft. per hour per cu. ft. of the resin bed.

References Cited in the file of this patent

UNITED STATES PATENTS 2,526,777     Smith                 Oct. 24, 1950

OTHER REFERENCES

Samuelson: "Ion Exchange in Analytical Chemistry," 1953, page 93, John Wiley and Sons, New York, N. Y.